Nov. 3, 1953

A. GAZDA 2,657,526

SELF-WINDING AUTO CLOCK

Filed July 26, 1950

INVENTOR
A. Gazda

BY Wenderoth, Lind & Ponack

ATTORNEYS

Nov. 3, 1953  A. GAZDA  2,657,526
SELF-WINDING AUTO CLOCK

Filed July 26, 1950  2 Sheets-Sheet 2

INVENTOR
A. Gazda
BY Wenderoth, Lind & Ponack
ATTORNEYS

Patented Nov. 3, 1953

2,657,526

UNITED STATES PATENT OFFICE 2,657,526

SELF-WINDING AUTO CLOCK

Antoine Gazda, Providence, R. I.

Application July 26, 1950, Serial No. 175,955

3 Claims. (Cl. 58—46)

This invention relates to a self-winding vehicle clock which is mounted upon the steering wheel in full view of the operator.

It is an object of the invention to design a clock which is reliable in operation when mounted upon a vehicle such as an automobile which is subject to vibrations.

A further object of the invention is to provide a clock which will wind the main spring of the clock regardless of the direction of the vibrations to which the automobile is subjected.

A still further object of the invention is to provide a pendulum operated main spring of a clock provided with a quadrant having a plurality of pawls cooperating with a single ratchet wheel which through intermediary gears drives the main spring of the watch.

With the above and other objects in view which will become apparent from the detailed description and claims set forth below the invention is shown in the drawings in which:

In the various views similar reference characters indicate like parts.

The clock mechanism for actuating the hands of the clock with the exception of the main spring and cooperating gears is not shown upon the drawings because such is not necessary for an understanding of the invention. Any standard time mechanism may be used.

The main spring of the clock is shown at 5 and this spring is wound through a train of gears 6.

Figure 4:
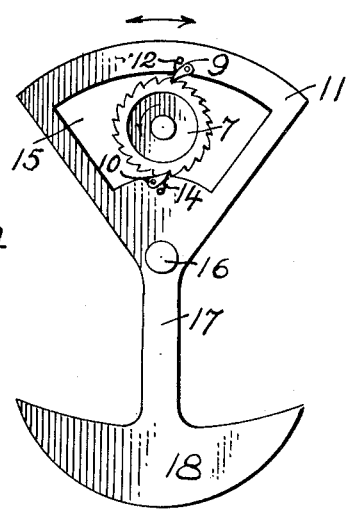
Fig. 4 is a plan view of the pendulum for winding the main spring with the cooperating pawls and ratchet.

The train of gears 6 has its lead gear driven by a spur gear not shown, fixed to the ratchet wheel 7. The ratchet wheel 7 is mounted upon the fixed pivot 8 and is actuated in one direction as shown by the arrow in Fig. 4 by means of the pawls 9 and 10 pivotally mounted upon the quadrant 11. The pawls 9 and 10 are urged toward the ratchet wheel 7 by the springs 12 and 14.

The quadrant 11 is constructed with a cut out sector 15 which receives the ratchet wheel 7 and is pivotally mounted upon the pivot 16. At the side opposite the sector 15 and the ratchet wheel 7 the quadrant 11 is extended with an integral arm 17 terminating in a weight 18 preferably of the form shown so that the quadrant 11, the arm 17, and the weight 18 constitute an oscillating pendulum which regardless of the direction the pendulum swings will drive the ratchet wheel 7 either by means of the pawl 9 or the pawl 10.

Also the main spring 5 is provided with means to prevent overwind such for instance as shown in U. S. Patent No. 211,280. Any type of overwind mechanism may, however, be used.

Figure 1:
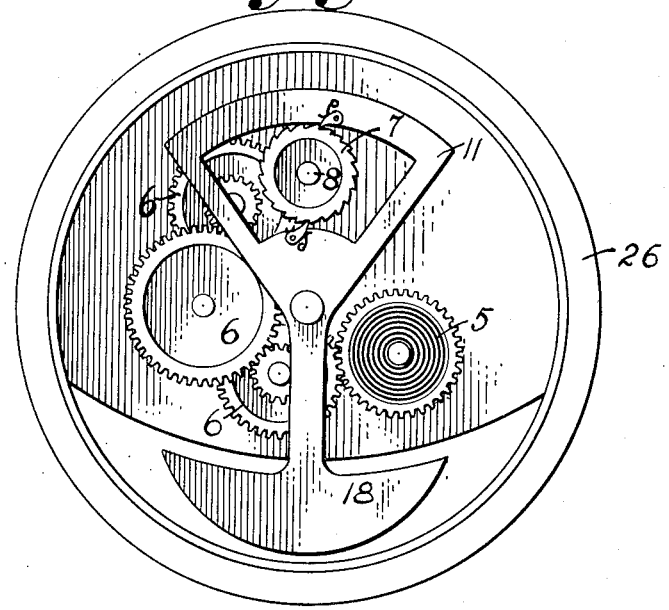
Fig. 1 is a plan view of the oscillating pendulum and cooperating gears and ratchet wheel for winding the main spring of a clock.
Figure 2:
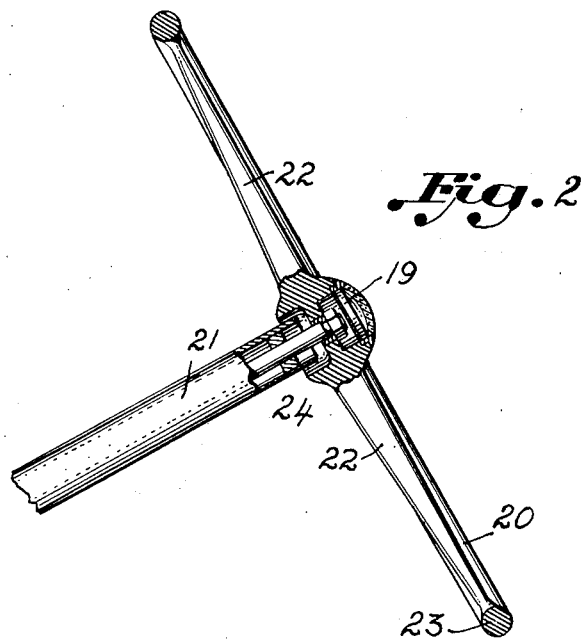
Fig. 2 is a partial side view of a steering wheel and steering column of an automobile with parts broken away showing a preferred location for the improved clock.

It is also obvious that the pendulum should be mounted so as to be able to oscillate under the influence of the vibrations of the automobile and therefore the clock shown generically at 19 in Fig. 2 is mounted upon a steering wheel 20 which is positioned at an angle to the horizontal upon a steering column 21 which is also positioned at an angle to the horizontal.

In this way the pendulum for winding the main spring 5 may oscillate freely. Also the clock 19 may, instead of the position shown, be mounted upon any of the spokes 22 of the steering wheel or even upon the rim 23. The steering wheel is secured to the steering rod 24 by the nut 25.

Figure 3:
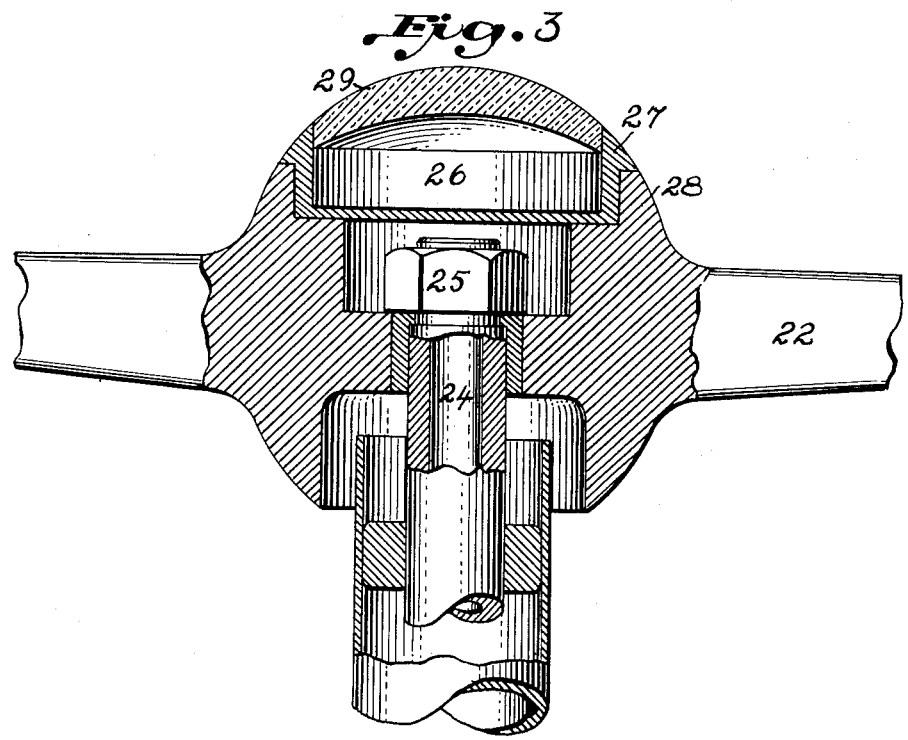
Fig. 3 is an enlarged view with parts broken away showing the location and mounting of the clock at the center of the steering wheel where the wheel is joined to the steering column.

The entire clock mechanism including the pendulum operating mechanism is enclosed in a case 26 which in turn is fixedly secured to a metal or plastic housing 27 of the form particularly shown in Fig. 3. The housing 27 is secured fixedly to the hub 28 of the steering wheel either by friction or by any other desired means. Directly above the clock face is secured a magnifying lens 29 of the form shown in Fig. 3. The magnifying lens 29 is fixed to the housing 27. The housing 27 may be secured by screw threading if desired and the magnifying lens 29 may be removably secured thereto.

The operation is believed to be obvious from the above description. Whenever the automobile is subjected to a vibration or whenever the operator of the automobile actuates the steering wheel in any direction the pendulum 18 will oscillate in one direction or the other as shown by the arrow above Fig. 4. This will result in actuation of the ratchet wheel 7 by either the pawl 9 or the pawl 10 and this will drive the gear train 6 in a direction to wind the main spring 5 of the clock. The overwind device referred to will prevent overwinding of the main spring 5.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:
1. A self-winding clock for automobiles and the like comprising a casing, a mainspring for the time mechanism in said casing, a ratchet wheel, a train of gears connecting said ratchet wheel with said mainspring, a member pivotally mounted at approximately its center at the center of said casing, a weight at one end of said member, the other end of said member being of sector shape and having an arc shaped recess therein, the opposed arcuate edges of said recess having a common center of curvature in the pivot point of said pendulum and pivoted pawls fixed to said member at said opposed arcuate edges of said recess actuating said ratchet wheel to wind said mainspring upon oscillation of said member due to said weight.

2. A self-winding clock for automobiles and the like comprising a casing, a mainspring for the time mechanism in said casing, a ratchet wheel, a train of gears connecting said ratchet wheel with said mainspring, a member pivotally mounted at approximately its center at the center of said casing, a weight at one end of said member, the other end of said member being of sector shape and having an arc shaped recess therein, the opposed arcuate edges of said recess having a common center of curvature in the pivot point of said pendulum pivoted pawls fixed to said member at said opposed arcuate edges of said recess actuating said ratchet wheel to wind said mainspring upon oscillation of said member due to said weight and springs urging said pawls against said ratchet wheel, said ratchet wheel having the center thereof intermediate of said arcuate edges.

3. A self-winding clock for automobiles and the like comprising a casing, a mainspring for the time mechanism in said casing, a ratchet wheel, a train of gears connecting said ratchet wheel with said mainspring, a member pivotally mounted at approximately its center at the center of said casing, a weight at one end of said member, the other end of said member being of sector shape and having an arc shaped recess therein, the opposed arcuate edges of said recess having a common center of curvature in the pivot point of said pendulum pivoted pawls fixed to said member at said opposed arcuate edges of said recess actuating said ratchet wheel to wind said mainspring upon oscillation of said member due to said weight and said ratchet wheel being located within said recess and having the center thereof intermediate of said arcuate edges.

ANTOINE GAZDA.

References Cited in the file of this patent

UNITED STATES PATENTS

| Number | Name | Date |
|---|---|---|
| 211,280 | Loehr | Jan. 7, 1879 |
| 2,234,527 | Hollingsworth | Mar. 11, 1941 |

FOREIGN PATENTS

| Number | Country | Date |
|---|---|---|
| 400,625 | Germany | Aug. 27, 1924 |